Aug. 18, 1936.                S. J. ERLING                    2,051,371
                        PULSATOR FOR MILKING MACHINES
                            Filed Jan. 19, 1935
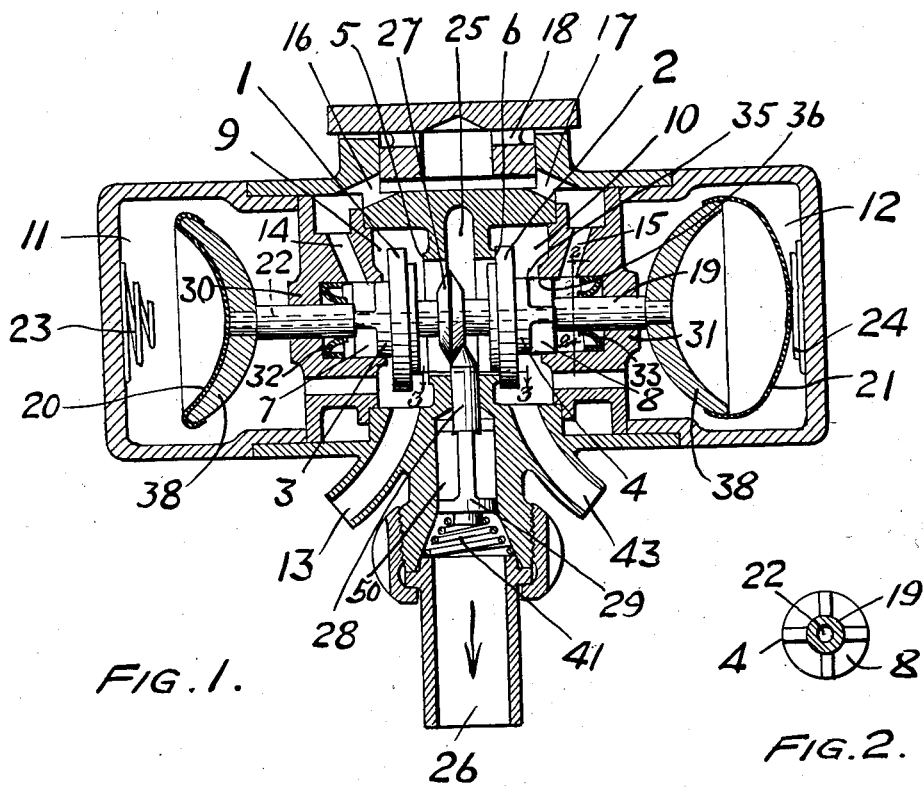
FIG. 1.
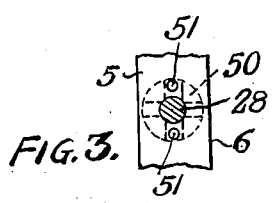
FIG. 3.
FIG. 2.
INVENTOR
Sven Johan Erling
BY
ATTORNEYS Patented Aug. 18, 1936

2,051,371

UNITED STATES PATENT OFFICE 2,051,371

PULSATOR FOR MILKING MACHINES

Sven Johan Erling, Nockeby, Sweden, assignor to The De Laval Separator Company, New York, N. Y., a corporation of New Jersey Application January 19, 1935, Serial No. 2,463
In Sweden February 9, 1934

18 Claims. (Cl. 31—69)

In milking machines the teat cups, or the pulsation chambers of two-chambered teat cups, are usually divided into two groups, which are alternately evacuated; that is, one group is subjected to atmospheric pressure while the other group is under vacuum, and the reverse. The pulsator must therefore be constructed to connect the pulsation chambers of the teat cups alternately with high and low pressure (e. g. atmospheric pressure and partial vacuum) in such a way that the above conditions are fulfilled. Pulsators of known constructions usually have either a single valve-slide which regulates all the functions, or a system of disc-valves, of which two valves, for instance, regulate the supply of atmospheric pressure and two other valves regulate the evacuation. The valves may be built together in pairs, so that only two discs are needed, each of which alternately conveys atmospheric pressure and vacuum to one of the teat cups. The valve-discs must then be movable within corresponding chambers for pulsating pressure and arranged to shut against the action of the atmospheric pressure. If the two valve-discs are fixed to the same valve-spindle, which is generally the case and has the advantage that simultaneous reversing of the valves is insured, a very great accuracy is needed in the manufacture of the pulsator, as otherwise one of the valves is likely to leak. The risk of leakage is particularly strong in regard to the valve that admits atmospheric air into the pulsation chambers, and those sides of the valve-discs that have the same function. After the parts have been in use for some time and consequently subjected to wear or other deforming of the valve-discs, which generally consist of rubber, liability to leakage still further increases. This risk would of course disappear, or at least be substantially reduced, if the valve-discs could be kept pressed on their seats by the difference of pressure on the two sides.

The use of valve-discs instead of one or more slides affords, however, a considerable advantage, as it insures that reversal of the valve system shall take place quickly and distinctly. The reversal may be effected by means of a diaphragm or bellows acting on the valve spindle, and occurs as soon as the axial force influencing the spindle reaches a given value. When the valve spindle has moved very little, only so much that the valves have left their seats, an equalization between the pressures on the two sides of the valve-discs takes place, so that the resistance to the force acting on the spindle and tending to bring about a reversal suddenly drops. The valve-spindle is thereby rapidly thrown over to the opposite position. A pulsator fitted with one or more slides for the regulation of the pressure has not the advantage of a distinct reversal and is therefore often provided with a mechanical device of one type or other for this purpose, which of course involves a complication. The single spindle valve-pulsator of heretofore known constructions has, however, the objection hereinbefore stated, namely, that the valves with their seats must fit very accurately to each other.

The object of the present invention is to eliminate the last named objection but simultaneously utilize the advantage of the valve-pulsator, that is, distinct reversal. According to the invention, this object is attained by a combination of a disc-valve and a slide-valve for the regulation of the pressure in each group of teat cups. The disc-valve is kept on its seat by the pressure, whereas the slide-valve, which is simultaneously closed, is not dependent on a carefully determined axial position for making a tight joint. In order that the invention may be clearly understood, I hereinafter describe a preferred embodiment of the invention that offers decided advantages but is not, of course, the only possible embodiment.

Milking machines operated by a pulsating vacuum heretofore have been so constructed that the change from vacuum to atmospheric pressure in the pulsation chambers of the teat cups takes place at the same rate as the change in the opposite direction. It has, however, proved advantageous to make the change from vacuum to atmospheric pressure much more slowly than the change from atmospheric pressure to vacuum; that is, to require a substantially longer time for the inhalation into the pulsating chamber than for the withdrawal of the air therefrom.

According to the invention this object is attained by so arranging the valves in the pulsator that they exert a substantially greater resistance to the air flowing into the teat cups than to the air flowing from the teat cups to the vacuum pipe lines. The throttling necessary is obtained by arranging the valve to open with a comparatively small throughflow section. With the commonly used pulsators with disc valves this would mean the movement of the disc valve a very small way from its seat. A construction of this type may no doubt be used for the purpose specified, but is in some respects objectionable. For instance, the valve has comparatively large surfaces at the point of throttling where impurities in the air may deposit and thus successively reduce the through-flow section. Experience has shown that valves of the slide type give a better result in this respect, it being possible easily to provide channels with such a section that the surfaces become small in relation to the throughflow section, which determines the size of the throttle. On the other hand, the disc type valve has decided advantages; for instance, there is no friction counteracting the reversal of the valves.

A milking machine pulsator of the common type comprises four cooperating valves, which alternately admit atmospheric air and vacuum to the pulsation chambers of the teat cups. Two of the valves are arranged to open and shut the communication between the atmosphere and the teat cups, and the two others to regulate the communication between the teat cups and the source of vacuum. According to my invention the two first-mentioned valves in a pulsator of the type under consideration may suitably be of the slide type whereas the two other valves are of the disc type. All the valves can be arranged on a common spindle and the slide valve may be arranged in immediate connection with one of the valve-discs.

Fig. 1 of the accompanying drawing shows a preferred embodiment of such an arrangement in longitudinal section. Fig. 2 is a cross-section, on the line 2—2 of Fig. 1, showing one of the slide-valves of Fig. 1. Fig. 3 is a sectional view on the line 3—3 of Fig. 1.

The apparatus comprises two valve-discs 1 and 2, suitably made of rubber, and connected respectively with valve-slides 3 and 4. The disc 1 cooperates with a valve seat 5 and the disc 2 with a valve seat 6. The valve slides 3 and 4 are provided respectively with recesses 7 and 8, communicating respectively, when the slide valves are open, with chambers 9 and 10, which communicate respectively with pulsation chambers 11 and 12, and, through the nipples 13 and 43, with the inflation chambers of the teat cups. Recesses 7 communicate thus with the air by channels 14, 16 and 18, and recesses 8 communicate with the air by channels 15, 17 and 18.

All the valves are mounted on a hollow spindle 19 which at opposite ends carries bellows 20 and 21, communicating with each other by a channel 22 in the spindle. In front of the bellows, springs 23 and 24 are provided in the chambers 11 and 12.

Between the valve seats 5 and 6 is a chamber 25, which communicates with a vacuum pipe 26 as hereinafter described. The spindle 19 extends through the chamber 25 and is there provided with a collar 27, which engages with a member 28, which extends down a chamber 50 and has at its end a piston 29 which is pressed by a spring 41 into the position shown and thereby tends to maintain the spindle 19 in one or the other of its end positions. In the casing close to the part thereof in which member 28 slides are orifices 51 which afford communication between chamber 25 and chamber 50. The parts 41, 29, 28 and 27 constitute a lock device for the spindle 19 for keeping the valve system and the wings in an accurate position when the pulsator is not in operation. When the pipe 26 is subjected to vacuum, the piston 29 is drawn back against the action of the spring 41, into the taper space around the spring, thus connecting chambers 50 and 25 with vacuum, and the part 28 is disengaged from the collar 27 and the spindle can work in the normal manner. When the vacuum in pipe 26 ceases, the parts 28, 29 are returned to the position illustrated on the drawing.

The spindle 19 extends through the walls 30 and 31 of the chambers 11 and 12, these walls closing the chambers from the atmospheric pressure which is always present in the channels 14 and 15. As the pressure in the chambers 11 and 12 pulsates, different pressures will at times prevail on the two sides of the walls 30 and 31. For preventing leakage of air along the spindle packings should therefore be arranged, suitably in the form of collar packings 32 and 33.

As may be seen by reference to Fig. 2, portions of the circumference of each of the slides 3 and 4 are left intact by the recesses 7 or 8, so that also in its open position the slide has good guidance.

In the position shown in the drawing the valves 2 and 3 are closed and the valves 1 and 4 are open. The chamber 9, the chamber 11 and the corresponding teat cups are consequently subjected to vacuum; whereas the chamber 10, the chamber 12 and the corresponding teat cups are under atmospheric pressure, as they communicate with the outer air through the recesses 8 and the channels 15 and 17. The bellows 21 will be compressed by the atmospheric pressure in the chamber 12, the air thereby streaming from the bellows 21 into the bellows 20, which can expand owing to the vacuum prevailing in the chamber 11. After the bellows 21 has been emptied and the bellows 20 has been filled with air, the spindle 19 is forced over into the opposite position by the pressure of the spring 23 against the bellows 20, the reversal of the spindle and the valves mounted thereon being quick and sharp. After the system of valves has thus been reversed, the chamber 11 is exposed to atmospheric pressure and the chamber 12 is subjected to vacuum, the result of which is that the air streams from the bellows 20 into the bellows 21 until the valve system is again thrown over into the opposite position by the pressure of the spring 24 against the expanded bellows 21.

In the position illustrated on the drawing air at atmospheric pressure streams through the recesses 8 of the valve 4 into the chamber 10 and thence through the hose nipple 43 into the inflation chamber of the corresponding teat cup. The opening area of the slide valve 4 is so determined that an interval of desired length is obtained during which the pressure in the teat cup increases from that prevailing in the vacuum pipe to atmospheric pressure. The throughflow opening of the valve 4 is determined by the position of the edge 35 of the valve slide relative to the edge 36 of the valve housing. This opening is easily determined with the desired accuracy by dimensioning the parts correspondingly.

It will be understood that the specific arrangement of the valves shown in Fig. 1 need not be adhered to.

Bellows 20 and 21 of different types may be used. According to the drawing they consist of a case bowl 38, for instance of hard rubber, fixed to the spindle, and provided around its edge with a rubber hood or diaphragm. This hood or diaphragm when not in operation assumes an approximately flat position. In operation the same total volume of the bellows is maintained independent of small leakages, which results in an unchanged frequency of pulsation.

What I claim and desire to protect by Letters Patent is:

1. A milking machine pulsator comprising a valve casing having passages adapted for connection with sources of high and low pressure respectively and with a pulsation chamber; a disc valve and its seat and a slide valve, said valves being connected to move in unison and cooperating to connect the pulsation chamber alternately with the high pressure passage and the low pressure passage.

2. A milking machine pulsator comprising a valve casing having a high pressure passage, a low pressure passage and a pulsation chamber; a disc valve adapted when unseated to connect one of said passages with the pulsation chamber and when seated to close such connection, and a slide valve adapted in one position to connect the other of said passages with the pulsation chamber and in another position to close such connection.

3. A milking machine pulsator comprising two pulsation chambers adapted for connection with different teat cups, and high and low pressure passages; and a combined disc valve and slide valve for each pulsation chamber, each pair of combined valves being movable to connect the corresponding pulsation chamber alternately with a high pressure passage and a low pressure passage.

4. A milking machine pulsator having a passage adapted for connection with sources of high and low pressure respectively and with a pulsation chamber; and two valves connected to move in unison, one valve being a slide valve adapted to connect and disconnect the pulsation chamber with the high pressure passage and the other valve being a disc valve adapted to connect and disconnect the pulsation chamber with the low pressure passage.

5. A milking machine pulsator comprising two pulsation chambers adapted for connection with different teat cups, and high and low pressure passages; and a combined disc valve and slide valve for each pulsation chamber, each pair of combined valves connected to move in unison, the slide valve of each pair being adapted to connect and disconnect the corresponding pulsation chamber with the high pressure passage and the disc valve of each pair being adapted to connect and disconnect the corresponding pulsation chamber with the low pressure passage.

6. A milking machine pulsator comprising two pulsation chambers adapted for connection with different teat cups, a low pressure chamber between the two pulsation chambers and having two valve seats, two high pressure passages, two disc valves and two slide valves connected to reciprocate in unison, the disc valves being positioned in the two pulsation chambers respectively and adapted to seat against their respective valve seats alternately and thereby connect each pulsation chamber in turn with the low pressure chamber and at the same time disconnect the other pulsation chamber from the low pressure chamber, each slide valve being adapted to connect one of the pulsation chambers with a high pressure passage when it is disconnected from the low pressure chamber.

7. A milking machine pulsator comprising a valve casing having passages for connection with sources of high and low pressure respectively and with a pulsation chamber, a slide valve and a disc valve connected to move in unison and adapted to alternately connect the pulsation chamber with the high pressure passage and the low pressure passage respectively, the slide valve being adapted to exert a considerably greater resistance to the air current than the disc valve so that increase of pressure in the pulsation chamber takes place at a slower rate than the reduction of pressure therein.

8. A milking machine pulsator comprising a valve casing having passages adapted for connection with sources of high and low pressure respectively and with a pulsation chamber; a disc valve, a slide valve, an axially reciprocable spindle carrying both valves, said valves in the reciprocation of said spindle cooperating to connect the pulsation chamber alternately with the high pressure passage and the low pressure passage.

9. A milking machine pulsator comprising a valve casing having passages adapted for connection with sources of high and low pressure respectively and with a pulsation chamber; a disc valve and a disc valve seat of relatively large diameter and a slide valve of relatively small diameter, said valves being connected together to operate in unison to connect the pulsation chamber alternately with said two passages.

10. A milking machine pulsator comprising a valve casing having passages adapted for connection with sources of high and low pressure respectively and with a pulsation chamber; a disc valve and a disc valve seat of relatively large diameter and a cylindrical slide valve of relatively small diameter which for part of its length has sectors thereof cut away to provide fluid passages leaving between them guiding surfaces when the valve is open.

11. A milking machine pulsator comprising a casing having a pulsation passage adapted for connection with teat cups, high and low pressure passages and pulsation chambers, bellows in said pulsation chambers, a spindle carrying said bellows and having a through passage in communication with both bellows, a disc valve and a slide valve carried by said spindle and cooperating to connect said pulsation passage and each pulsation chamber alternately with the high pressure passage and the low pressure passage and to connect each pulsation chamber with the high pressure passage when the other pulsation chamber is connected with the low pressure passage, each bellows being operable by the high pressure in the corresponding end chamber to transmit pressure through the spindle passage to the other bellows.

12. A milking machine pulsator comprising a casing having a pulsation passage adapted for connection with teat cups, high and low pressure passages and pulsation chambers, bellows in said pulsation chambers, a spindle carrying said bellows and having a through passage in communication with both bellows, a disc valve and a slide valve carried by said spindle and cooperating to connect said pulsation passage and each pulsation chamber alternately with the high pressure passage and the low pressure passage and to connect each pulsation chamber with the high pressure passage when the other pulsation chamber is connected with the low pressure passage, each bellows being operable by the high pressure in the corresponding end chamber to transmit pressure through the spindle passage to the other bellows, and springs in the pulsation chambers adapted to cooperate with the bellows therein to shift the valve spindle axially.

13. A milking machine pulsator comprising a valve casing having passages adapted for connection with sources of high and low pressure respectively and with a pulsation chamber; a disc valve, a slide valve, an axially reciprocable spindle carrying both valves, said valves in the reciprocation of said spindle cooperating to connect the pulsation chamber alternately with the high pressure passage and the low pressure passage, and a lock device adapted to act on the spindle to hold it in one of its end positions when the pulsator is not in operation.

14. A milking machine pulsator comprising a valve casing having passages adapted for connection with sources of high and low pressure respectively and with a pulsation chamber; a disc valve, a slide valve, an axially reciprocable spindle carrying both valves, said valves in the reciprocation of said spindle cooperating to connect the pulsation chamber alternately with the high pressure passage and the low pressure passage, a lock device adapted to act on the spindle to hold it in one of its end positions when the pulsator is not in operation, and means actuable by pressure media to move the locking device into unlocking position when the pulsator is in operation.

15. A milking machine pulsator comprising a valve casing having passages adapted for connection with sources of high and low pressure respectively and with a pulsation chamber; a disc valve, a slide valve, an axially reciprocable spindle carrying both valves, said valves in the reciprocation of said spindle cooperating to connect the pulsation chamber alternately with the high pressure passage and the low pressure passage, a lock device adapted to act on the spindle to hold it in one of its end positions, and means, actuable by unbalanced pressure when the low pressure passage is connected with a source of low pressure, to move the locking device into unlocking position.

16. A milking machine pulsator comprising a valve casing having passages adapted for connection with sources of high and low pressure respectively and with a pulsation chamber; a disc valve, a slide valve, an axially reciprocable spindle carrying both valves, said valves in the reciprocation of said spindle cooperating to connect the pulsation chamber alternately with the high pressure passage and the low pressure passage, a lock device movable toward and from the spindle into and out of locking position, a piston connected with the lock device, a spring tending to move the piston and thereby move the locking device into locking position, said piston being so positioned in the low pressure passage that upon connection of the latter with the source of low pressure the piston will be moved into position to withdraw the locking device from locking position.

17. A milking machine pulsator comprising a casing having a pulsation passage adapted for connection with teat cups, a high pressure passage, a low pressure passage, a pulsation passage, a pulsation chamber, valve mechanism adapted to be moved into position to connect the pulsation passage and pulsation chamber alternately with the high pressure passage and the low pressure passage, bellows in said pulsation chamber operable by change of pressure therein to shift said valve mechanism from one operative position to the other, said bellows comprising a bowl shaped body and a diaphragm covering the concavity of the body and having its periphery secured to the edge of the bowl and which, in tensionless state, assumes a substantially flat form.

18. A milking machine pulsator comprising two pulsation chambers adapted for connection with different teat cups, a high pressure chamber between the two pulsation chambers and having two valve seats, two low pressure passages, a disc valve and two slide valves connected to reciprocate in unison, the disc valve being positioned in the high pressure chamber and adapted to seat against the two valve seats alternately and thereby connect each pulsation chamber in turn with the high pressure chamber and at the same time disconnect the other pulsation chamber from the high pressure chamber, each slide valve being adapted to connect one of the pulsation chambers with a low pressure passage when it is disconnected from the high pressure chamber.

SVEN JOHAN ERLING.